(12) United States Patent
Cattoor et al.

(10) Patent No.: US 12,208,680 B2
(45) Date of Patent: *Jan. 28, 2025

(54) POWER TAKE-OFF (PTO) ASSEMBLY WITH A DISCONNECT CLUTCH

(71) Applicant: Dana Belgium N.V., Flanders (BE)

(72) Inventors: Kurt Cattoor, Koolkerke (BE); Filip D. Schacht, Meulebeke (BE); Jan Markey, Wingene (BE); Filip Van Raepenbusch, Bruges (BE); Jan A. Bedert, Oostduinkerke (BE)

(73) Assignee: DANA BELGIUM N.V., Bruges (BE)

( * ) Notice: Subject to any disclaimer, the term of this patent is extended or adjusted under 35 U.S.C. 154(b) by 85 days.

This patent is subject to a terminal disclaimer.

(21) Appl. No.: 18/145,734

(22) Filed: Dec. 22, 2022

(65) Prior Publication Data

US 2024/0209878 A1 Jun. 27, 2024

(51) Int. Cl.
*B60K 25/06* (2006.01)
*B60K 17/28* (2006.01)
*F16D 25/061* (2006.01)
*F16D 48/02* (2006.01)

(52) U.S. Cl.
CPC .............. *B60K 25/06* (2013.01); *B60K 17/28* (2013.01); *F16D 25/061* (2013.01); *F16D 48/02* (2013.01); *F16D 2048/0248* (2013.01); *F16D 2048/0263* (2013.01)

(58) Field of Classification Search
CPC ......... B60K 17/28; B60K 25/06; F16D 48/02; F16D 2048/0248; F16D 2048/0263; F16D 25/061
See application file for complete search history.

(56) References Cited

U.S. PATENT DOCUMENTS

| 7,832,538 | B2 | 11/2010 | Robinson |
| 8,166,837 | B2 | 5/2012 | Buhrke |
| 8,230,954 | B2 | 7/2012 | Majkrzak |
| 8,818,588 | B2 | 8/2014 | Ambrosio et al. |
| 11,884,151 | B1 * | 1/2024 | Cattoor ................. B60K 25/06 |

FOREIGN PATENT DOCUMENTS

| EP | 1795391 A1 * | 6/2007 | ............. F16D 48/02 |
| EP | 2934935 B1 | 8/2016 | |
| WO | 2009082413 A1 | 7/2009 | |

OTHER PUBLICATIONS

Cattoor, K. et al., "Multi-Speed Transmission and Method for Transmission Operation," U.S. Appl. No. 17/817,844, filed Aug. 5, 2022, 25 pages.

* cited by examiner

*Primary Examiner* — Richard M Lorence
(74) *Attorney, Agent, or Firm* — McCoy Russell LLP

(57) ABSTRACT

Systems and methods for a power take-off (PTO) assembly. The PTO assembly, in one example, couples to a shaft and is driven by rotation of the shaft. The PTO assembly includes a disconnect clutch that selectively couples a bi-directional pump to the shaft. The disconnect clutch is passively actuated based on hydraulic system pressure to disengage the disconnect clutch when a prime mover is in operation and engage the disconnect clutch when the prime mover is shut down.

19 Claims, 9 Drawing Sheets

POWER TAKE-OFF (PTO) ASSEMBLY WITH A DISCONNECT CLUTCH

TECHNICAL FIELD

The present disclosure relates to a ground driven power take-off (PTO) assembly with a disconnect clutch that is passively actuated.

BACKGROUND AND SUMMARY

Certain systems such as powertrains include power take-offs (PTOs) that may be either hydraulic or mechanical PTOs. The PTOs allow the vehicle's operational capabilities to be expanded and may be used in a wide variety of vehicle platforms as well as other systems. Some PTOs are driven by engines or motors such as live PTOs where an engine output shaft provides power to a PTO.

In prior transmissions, when a vehicle is towed, the supply of oil to the transmission may be cut off. When towing over long distances, the lack of transmission lubrication may cause component degradation, thereby decreasing the transmission's lifespan.

Attempts have been made to provide ground driven PTOs in previous transmissions. For instance, WO 2009/082413 A1 to Wikner et al. teaches a ground driven PTO. The ground driven PTO includes a PTO selector that is designed to actively connect and disconnect a gear shaft to/from a PTO shaft.

The inventors herein have recognized several drawbacks with Wikner's ground driven PTO system as well as other previous systems. For instance, Wikner's PTO is actively connected and disconnected from a transmission shaft and therefore increase the size and complexity of the system as well as necessitates control logic for connecting and disconnecting the PTO. Consequently, Wikner's system may be prone to component degradation and may be constrained with regard to its applicability in certain transmissions, such as transmissions with high space efficiency demands.

The inventors have recognized the aforementioned issues and developed a PTO assembly to at least partially overcome at least a portion of the issues. The PTO assembly includes, in one example, a bi-directional pump that is in fluidic communication with a fluid reservoir (e.g., lubricant reservoir) and a hydraulic system. The PTO assembly further includes a passively actuated disconnect clutch configured to mechanically disconnect the bi-directional pump from a transmission when a prime mover is in operation and mechanically connect the bi-directional pump to the transmission when the prime mover is shut down. In this way, the bi-directional pump is able to provide lubricant to the transmission while the prime mover is shut down and the transmission is receiving rotational input such as during towing operation as well as while the prime mover is non-operational and the vehicle is coasting. Consequently, the chance of component degradation in the transmission system is reduced during certain operating conditions such as towing, thereby increasing transmission longevity. Further, passive actuation of the bi-directional pump via the disconnect clutch allows the use of control algorithms or manual actuation by an operator to be avoided, if so desired. Consequently, the PTO assembly may more efficiently and reliably provide lubricant to the transmission while the prime mover is shut down or unable to operate.

The PTO assembly may further include a hydraulically actuated valve that is in fluidic communication with the passively actuated disconnect clutch. Further, in such an example, the hydraulically actuated valve may include an actuation line that is hydraulically coupled to an outlet line of the bi-directional pump. When the fluid pressure in the outlet line is above a threshold pressure, the valve permits fluid flow from a main hydraulic circuit in the hydraulic system to a hydraulic actuator of the disconnect clutch. Therefore, when the fluid pressure in the main hydraulic circuit surpasses a threshold value the disconnect clutch is disengaged. Conversely, when the fluid pressure in the outlet line is below the threshold pressure, the valve inhibits fluid flow to hydraulic actuator of the disconnect clutch, which conversely causes engagement of the disconnect clutch. In this way, the deactivation of the bi-directional pump may be delayed until the hydraulic system provides sufficient fluid to the transmission to reduce the likelihood of component degradation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A power take-off (PTO) assembly with a disconnect clutch and a bi-directional pump for use with a hydraulic system is described herein. The PTO assembly may be coupled to a transmission via a shaft (e.g., an output shaft) such that the PTO assembly may be receive rotational input when the shaft is rotating (either via a prime mover or via wheel rotation, as during a tow operation). The bi-directional pump provides lubricant to the hydraulic system when the prime mover (e.g., an internal combustion engine or electric motor) coupled to the transmission is shut down by pumping fluid from a sump to transmission components. To achieve this functionality, the disconnect clutch is configured to passively disconnect the bi-directional pump from the transmission when the prime mover is in operation and mechanically connect the bi-directional pump to the transmission when the prime mover is shut down. Pump disconnection and connection is achieved using a hydraulic circuit that passively permits and inhibits fluid flow to a clutch piston according to fluid pressure in the hydraulic system. The disconnect clutch, when engaged, allows rotational energy to be transmitted from the transmission shaft to the bi-directional pump. When disengaged, rotational power is not transmitted to the bi-directional pump. Consequently, the transmission is lubricated while the transmission shaft is rotating and the engine or other suitable prime mover coupled to the transmission is shut down.

Figure 1:
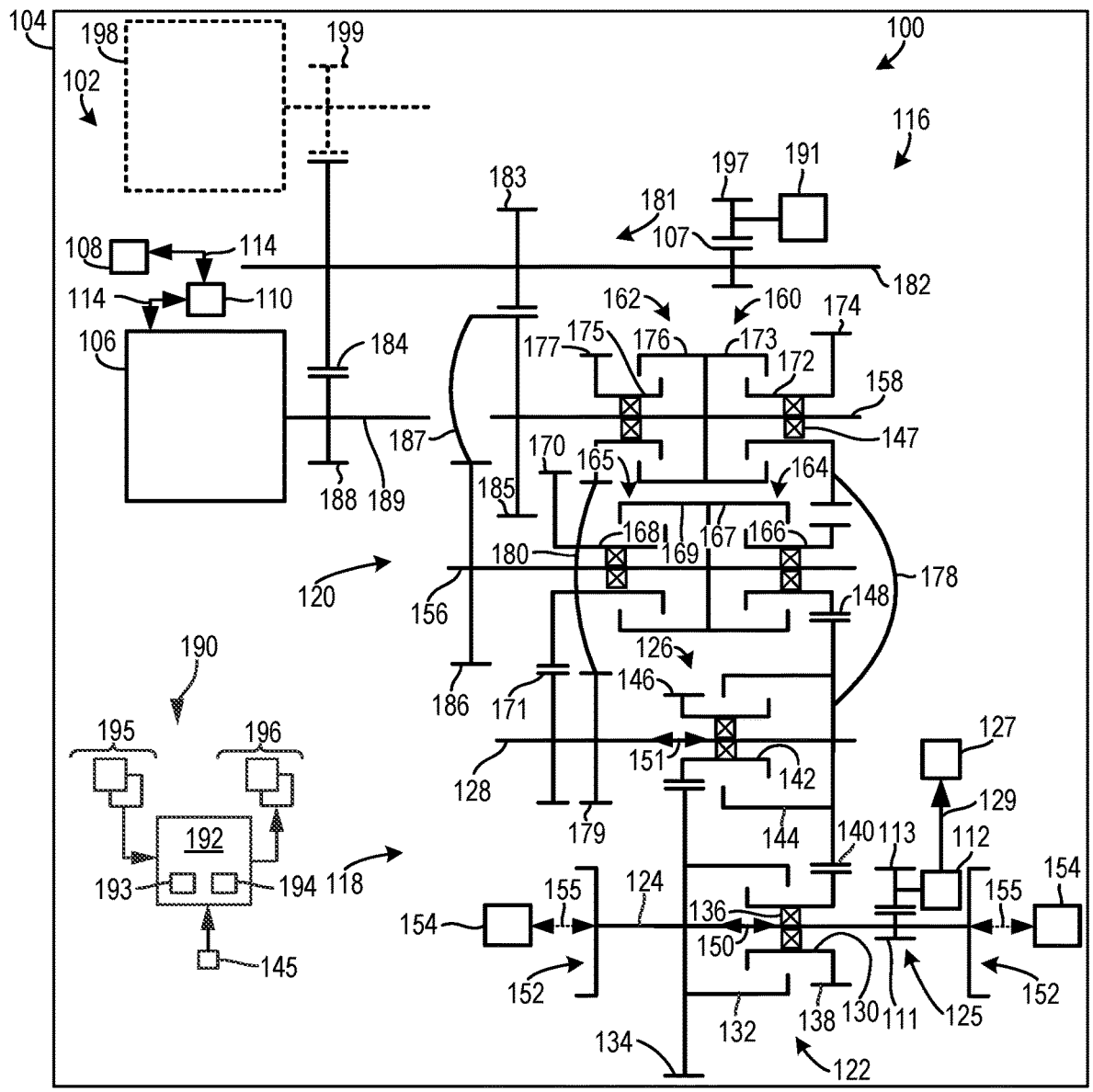
FIG. 1 is a schematic diagram of an electric drive unit with a transmission system including a PTO assembly.
Figure 2:
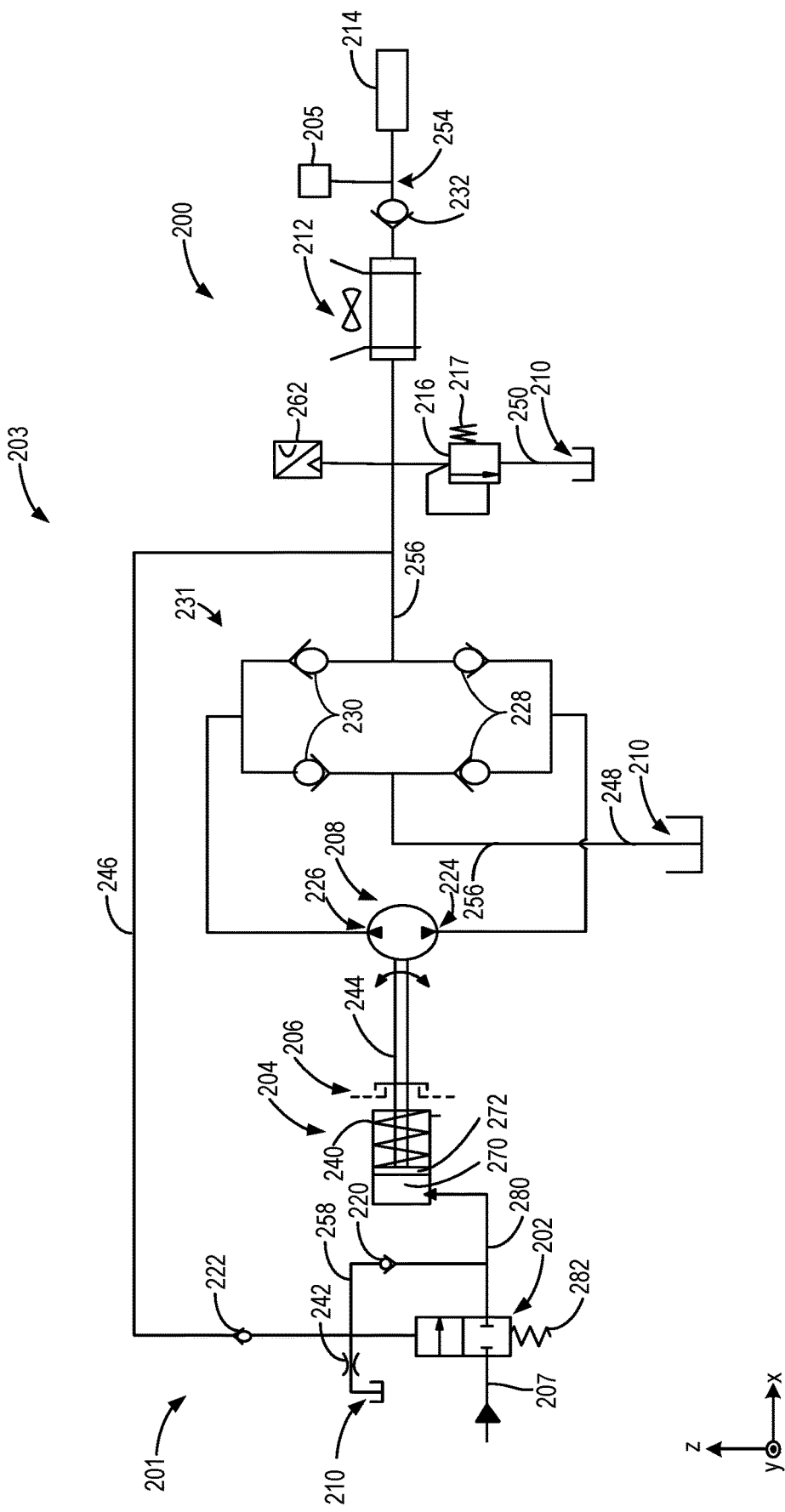
FIG. 2 is a hydraulic schematic of a PTO assembly and a lubrication system.
Figure 3:
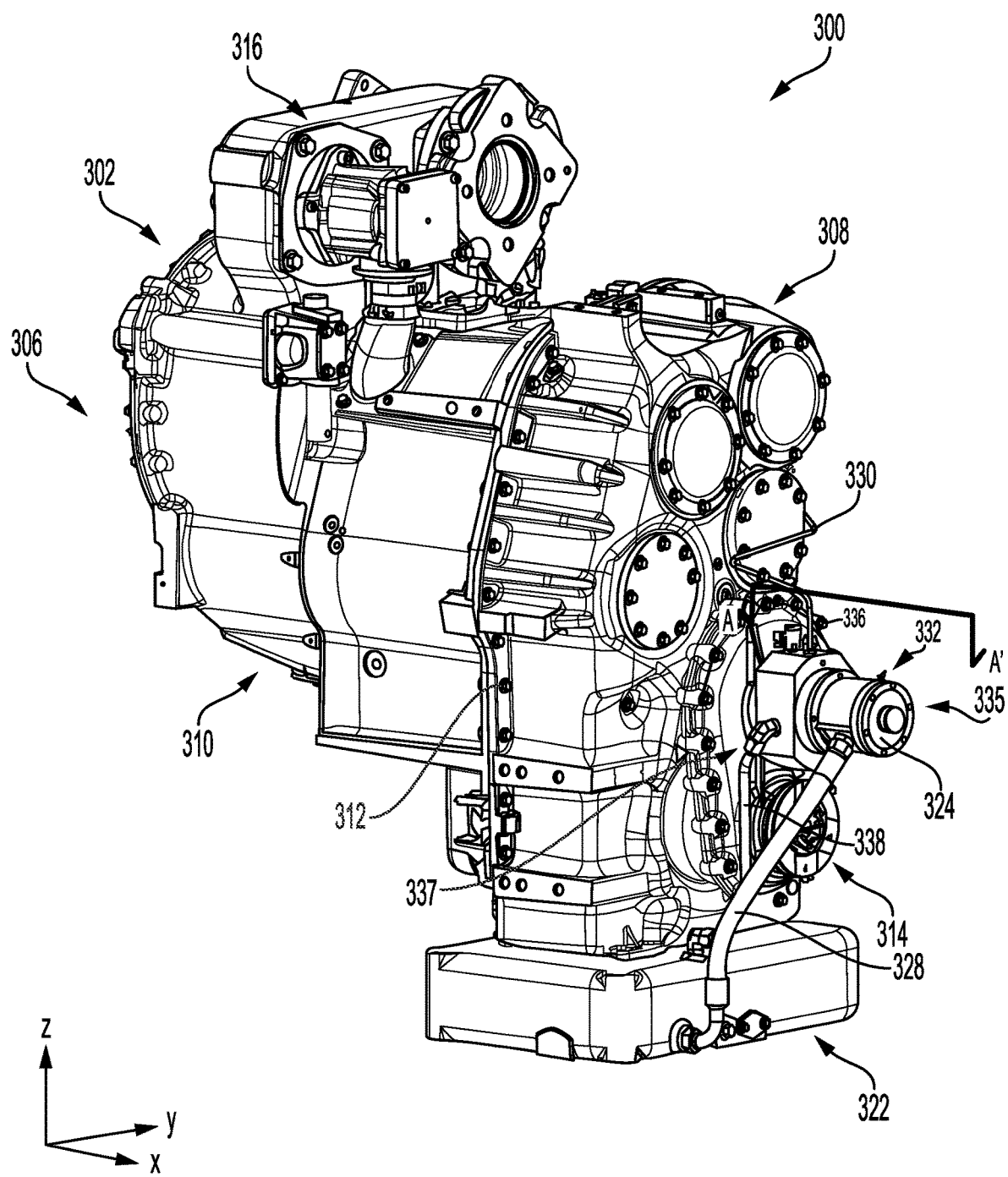
FIG. 3 is a detailed illustration of an exemplary transmission.

The PTO assembly described herein may be used in any number of suitable systems such as a transmission. An exemplary transmission system with a PTO assembly is shown in FIG. 1. A schematic diagram of an exemplary hydraulic circuit in a PTO assembly is depicted in FIG. 2. Illustrations of an exemplary PTO assembly and hydraulic system are shown in FIGS. 3, 4, 5A, and 5B. Methods of operation for the passively actuated PTO assembly are depicted in flowcharts in FIGS. 6 and 7. A use-case scenario for operation of the passively actuated hydraulic circuit in the PTO assembly is shown in a timing diagram depicted in FIG. 8.

FIG. 1 depicts a transmission system 100. The transmission system 100 in the illustrated example, may be included in an electric drive unit 102 of a vehicle 104 such as an electric vehicle (EV) (e.g., a battery electric vehicle (BEV)), although alternative examples are possible such as hybrid electric vehicles (HEV) that utilize an internal combustion engine for propulsion and/or recharging of an energy storage device. Further, in other examples the transmission system may be utilized in a vehicle powertrain which solely utilizes an internal combustion engine as the prime mover.

The electric drive unit 102 generates motive power for vehicle propulsion. The vehicle 104 may be an on-highway vehicle such as a sedan or truck or an off-highway vehicle such as a material handling, mining, or railway vehicle. More generally, the vehicle 104 may be a light, medium, or heavy duty vehicle, for instance.

The electric drive unit 102 may include an electric machine 106 (e.g., traction motor). However, another suitable prime mover may be used in place of the electric machine 106 such as an internal combustion engine or hydraulic motor, in other examples. The electric machine 106 may include components such as a rotor and a stator that electromagnetically interact during operation to generate motive power. Further in one example, the electric machine may be a motor-generator which is designed to generate electrical energy during regeneration operation.

The electric machine 106 may be electrically coupled to one or more energy storage device(s) 108 (e.g., one or more traction batteries, capacitor(s), fuel cell(s), combinations thereof, and the like) by way of an inverter 110 when the machine is designed as alternating current (AC) machine. However, a direct current (DC) electric machine may be used in alternate examples.

Arrows 114 denote the electrical connection between the electric machine 106, the inverter 110, and the energy storage device(s) 108. The inverter 110 may be designed to convert direct current (DC) to AC and vice versa. In one use-case example, the electric machine 106 and the inverter 110 may be three-phase devices which can achieve greater efficiency when compared to other types of motors. However, motors and inverters designed to operate using an alternate number of phases have been envisioned.

The electric machine 106 may be rotationally coupled to the transmission system 100. Further, the transmission system 100 may include a multi-speed transmission 116 (e.g., a multi-speed gearbox) with multiple assemblies. When the multi-speed transmission is used in an EV it may be referred to as an electric multi-speed transmission. However, in other examples, the transmission may be a single speed transmission.

The multi-speed transmission 116 may include one or more clutch assemblies, such as a higher-lower range clutch assembly 118 and a multi-speed clutch assembly 120. The higher-lower range clutch assembly 118 may be positioned downstream of the multi-speed clutch assembly 120. The higher-lower range clutch assembly 118 may include a higher range clutch 122 positioned coaxial to an output shaft 124 and a lower range clutch 126 positioned coaxial to a first layshaft 128. However, in another example, the higher range clutch may be positioned coaxial to the first layshaft and the lower range clutch may be positioned coaxial to the output shaft. It will be understood, that other clutch architectures in the transmission may be used. For instance, the number, positioning, and/or type of clutches used in the transmission may be altered to meet different end-use design goals.

The higher range clutch 122 as well as the other clutches described herein may be friction clutches (e.g., wet friction clutches). The friction clutches described herein may be operated with varying amounts of engagement (e.g., continuously adjusted through the clutch's range of engagement) of friction plates and spacers. Further, the friction clutches described herein may be wet friction clutches through which lubricant is routed to increase clutch longevity. Specifically, oil may be routed between the friction plates prior to, during, and/or after engagement in order to reduce degradation of the friction plates long term. The higher range clutch 122 and the other clutches described herein may be adjusted via hydraulic, pneumatic, and/or electro-mechanical actuators. For instance, hydraulically operated pistons may be used to induce clutch engagement/disengagement. However, solenoids may be used for electro-mechanical clutch actuation, in other examples. Using friction clutches allows power interruptions during shifting transients to be reduced, thereby increasing transmission performance. However, other types of clutches such as dog clutches may be used in the transmission, in other examples.

In the friction clutch example, the higher range clutch 122 includes an inner carrier 130 and an outer carrier 132. The inner carrier 130 has a first set of plates mounted thereto and the outer carrier 132 has a second set of plates mounted thereto. These plates may frictionally engage when the clutch is closed to permit torque transfer from the inner carrier 130 to the outer carrier 132. Conversely, when the clutch is open the plates may be frictionally disengaged. As such, the clutch may be in an engaged state when it is closed and a disengaged state when it is open. The outer carrier 132 may be fixedly coupled to a gear 134 that is fixedly coupled to the output shaft 124. A bearing 136 may serve as the rotational connection between the inner carrier 130 and the output shaft 124. The bearing 136 as well as the other bearings described herein may include an inner race, an outer race, and roller elements (e.g., cylindrical rollers, tapered rollers, balls, and the like). The inner clutch carriers depicted in FIG. 1 are shown coupled to a single bearing. However, it will be understood that the clutch carriers may be coupled to multiple bearings, in other examples. Further, the inner carrier 130 is fixedly coupled to a gear 138 which meshes with a gear 140 coupled to the first layshaft 128.

Again in the friction clutch example, the lower range clutch 126 includes an inner carrier 142 and an outer carrier 144 which each have different sets of plates mounted thereto and functions in the similar manner to the higher range clutch 122 with regard to plate engagement and disengagement. The other friction clutches of the multi-speed transmission 116 described herein also includes plates the function in a similar manner and repeated description of the plates is omitted for brevity. The inner carrier 142 may be fixedly coupled to a gear 146 that meshes with the gear 134. Conversely, the outer carrier 144 may be fixedly coupled to the gear 140 that meshes with the gear 138 and a gear 148.

In the illustrated example, the higher and lower range clutches 122 and 126 are axially offset along their rotational axes 150 and 151. In this way, the transmission's space efficiency is increased when compared to clutches that have the same position along their respective rotational axes. However, in other examples, the higher and lower range clutches may have alternate axial positions.

As illustrated, the output shaft 124 may include two mechanical interfaces 152 which are designed to mechanically attach to downstream driveline components such as shafts, joints, and the like that transfer mechanical power to drive axle assemblies 154 which may each include a differential, axle shafts (e.g., half shafts), drive wheels, and the like. This mechanical power transfer is denoted via arrows 155. In other examples, the output shaft 124 may include one mechanical interface or more than two mechanical interfaces.

The output shaft 124 may further include a PTO gear set 125. The output shaft 124 may be removably coupled to a gear 111 which meshes with a gear 113. Gear 113 may be coupled, either fixedly or removably, to a PTO assembly 112 or included therein. The PTO assembly 112 may be referred to as a ground driven PTO assembly that is driven via rotation of the output shaft 124, during towing for example. Towing operating as described herein is an operating condition where the prime mover is not in operation and vehicle drive wheels are rotating due to the vehicle 104 being attached to a tow vehicle (e.g., tow truck). However, in alternate examples, the PTO assembly 112 may be driven by another shaft in the transmission 116. The PTO assembly 112 provides fluid (e.g., lubricant) to a hydraulic system 127 which in turn provides fluid to components in the transmission with fluid demands for lubrication and/or actuation such as the clutches, bearings, and the like. Arrow 129 denotes the fluidic connection between the PTO assembly 112 and the hydraulic system 127 which is expanded upon herein with regard to FIGS. 2-5B. It will be understood that the PTO gear set 125 may be incorporated into the PTO assembly 112 and the PTO assembly may be formed as a unit that is removably coupled to the output shaft 124. In this way, the PTO assembly 112 may be efficiently incorporated into the transmission at a later stage in the manufacturing process, when compared to PTOs that are attached to the transmission at upstream locations. Designing the PTO assembly and gears as a monolithic unit allows, the applicability of the PTO assembly to be expanded while increasing the transmission's functional capabilities.

In some examples, the multi-speed clutch assembly 120 includes two or more clutches arranged on a second layshaft 156 and a third layshaft 158. To elaborate, in the illustrated example, a first pair of clutches which includes a first gear clutch 160 and a third gear clutch 162 are positioned coaxial to the third layshaft 158 and a second pair of clutches which includes a second gear clutch 164 and a fourth gear clutch 165 are positioned coaxial to the second layshaft 156.

The second gear clutch 164 may include an inner carrier 166 and an outer carrier 167. The inner carrier 166 may be fixedly coupled to the gear 148 that meshes with the gear 140. The outer carrier 167 may be fixedly coupled to the second layshaft 156.

The fourth gear clutch 165 may include an inner carrier 168 and an outer carrier 169. The inner carrier 168 may be fixedly coupled to a gear 170 that meshes with a gear 171 on the first layshaft 128. The outer carrier 169 may be again fixedly coupled to the second layshaft 156.

The first gear clutch 160 may include an inner carrier 172 and an outer carrier 173. The inner carrier 172 may be fixedly coupled to a gear 174 that is rotationally coupled to the gear 140 as denoted via curved line 178. In other words, the gear 174 may mesh with the gear 140. However, in other examples, the gear 174 may be coupled to the gear 140 via a mechanical coupling such as one or more gears, shafts, joints, and the like. The inner carrier 172 may be fixedly coupled to the third layshaft 158.

The third gear clutch 162 may include an inner carrier 175 and an outer carrier 176. The inner carrier 175 may be fixedly coupled to a gear 177 that is rotationally coupled to a gear 179 on the first layshaft 128 as denoted via curved line 180. In other words, the gear 177 may mesh with the gear 179. However, in other examples, the gear 177 may be coupled to the gear 179 via a mechanical coupling such as one or more gears, shafts, joints, and the like. The inner carrier 175 may be fixedly coupled to the third layshaft 158.

The multi-speed transmission 116 further includes, in the illustrated example, an input assembly 181 that includes an input shaft 182 with a gear 183 and a gear 184 fixedly coupled thereto. The gear 183 meshes with a gear 185 fixedly coupled to the third layshaft 158. The gear 185 is rotationally coupled to a gear 186 that is fixedly coupled to the second layshaft 156 as denoted via curved line 187.

In other words, the gear 185 may mesh with the gear 186. However, in other examples, the gear 185 may be coupled to the gear 186 via a mechanical coupling such as one or more gears, shafts, joints, and the like. Further, the gear 184 meshes with a gear 188 on an electric machine interface shaft 189. In turn, the electric machine interface shaft 189 is coupled to a rotor shaft in the electric machine 106.

Input shaft 182 further includes a gear 107 fixedly coupled thereto. Gear 107 may mesh with a gear 197, which may be fixedly or removably coupled to a pump 191 (e.g., charging pump). As such, the electric machine 106 may provide rotational power to the pump 191. The pump 191 may provide pressurized fluid (e.g., lubricant such as mineral based and/or synthetic oil) to clutches for actuation and/or lubrication as well as bearings and/or other components in the transmission with fluid demands.

A second electric machine 198 may additionally be coupled to the multi-speed transmission 116, in one example, via a gear 199 that meshes with the gear 184. However, in other examples, the second electric machine 198 may be omitted from the electric drive unit 102.

The output shaft 124 may be arranged below the layshafts 128, 156, 158 as well as an input shaft 182. In this way, the transmission achieves a desired drop that has applicability in a wide range of vehicles. However, the output shaft may be positioned above at least one of the layshafts, in other examples.

The multi-speed transmission 116 may further include bearings 147 that are coupled to inner carriers of the clutches and the corresponding shafts that are coaxial to the inner carriers. In this way, the inner carriers can independently rotate with regard to the shafts when the clutches are disengaged.

The vehicle 104 may further include a control system 190 with a controller 192 as shown in FIG. 1. The controller 192 may include a microcomputer with components such as a processor 193 (e.g., a microprocessor unit), input/output ports, an electronic storage medium 194 for executable programs and calibration values (e.g., a read-only memory chip, random access memory, keep alive memory, a data bus, and the like). The storage medium may be programmed with computer readable data representing instructions executable by a processor for performing the methods and control techniques described herein as well as other variants that are anticipated but not specifically listed.

The controller 192 may receive various signals from sensors 195 coupled to various regions of the vehicle 104 and the multi-speed transmission 116. For example, the sensors 195 may include a pedal position sensor designed to detect a depression of an operator-actuated pedal such as an accelerator pedal and/or a brake pedal, a speed sensor at the transmission output shaft, energy storage device state of charge (SOC) sensor, clutch position sensors, and the like. Motor speed may be ascertained from the amount of power sent from the inverter to the electric machine. An input device 145 (e.g., accelerator pedal, brake pedal, drive mode selector, combinations thereof, and the like) may further provide input signals indicative of an operator's intent for vehicle control.

Upon receiving the signals from the various sensors 195 of FIG. 1, the controller 192 processes the received signals, and employs various actuators 196 of vehicle and/or transmission components to adjust the components based on the received signals and instructions stored on the memory of controller 192. For example, the controller 192 may receive an accelerator pedal signal indicative of an operator's request for increased vehicle acceleration. In response, the controller 192 may command operation of the inverter 110 to adjust electric machine mechanical power output and increase the power delivered from the electric machine 106 to the multi-speed transmission 116. The controller 192 may, during certain operating conditions, be designed to send commands to the clutches 122, 126, 160, 162, 164, 165, to engage and disengage the clutches. For instance, a control command may be sent to the higher range clutch 122 and in response to receiving the command, an actuator in the clutch may adjust the clutch based on the command for clutch engagement or disengagement. The other controllable components in the vehicle may function in a similar manner with regard to sensor signals, control commands, and actuator adjustment, for example.

An axis system is provided in FIG. 1 as well as FIGS. 2-5B, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

The multi-speed transmission 116 may be designed to operate with an equal number of forward and reverse driving gear modes. For instance, in the illustrated example, the transmission has eight forward and reverse gear modes. However, it will be appreciated that the transmission may be designed with a different number of gear modes which may be symmetric in some cases. For instance, the transmission may have two, three, four, or sixteen forward and/or reverse gear modes.

To operate the multi-speed transmission 116 in a reverse drive mode the electric machine 106 may spin the rotor shaft in an opposite direction as the forward drive mode. Designing the electric machine 106 in this manner allows the compactness of the transmission to be reduced when compared to transmissions with mechanical reverse assemblies. However, in other examples, the transmission may include a mechanical reverse that decreases the system's space efficiency.

The transmission 116 is described as one possible exemplary embodiment and that other configurations of exemplary transmission systems with other configurations of clutches, gears, and/or shafts are possible without departing from the scope of this disclosure. For instance, the electric machine 106 and/or the electric machine 198 may be replaced with internal combustion engine(s), in one example. In other examples, the multi-speed transmission may provide motive power to a first drive axle assembly while an internal combustion engine provides motive power to a second drive axle assembly. Still further, in other embodiments, an internal combustion engine may be provided to recharge the energy storage device(s) 108. However, it will be understood, that when the transmission is used in an all-electric vehicle, the system may be simplified thereby reducing manufacturing costs and the chance of component failure.

FIG. 2 schematically illustrates a hydraulic system 200 and a passive hydraulic actuation circuit 201 in a PTO assembly 203. It will be understood that the PTO assembly 203 and the hydraulic system 200 depicted in FIG. 2 as well as the other PTO assemblies described herein may be included in the transmission system depicted in FIG. 1 or another suitable system.

The hydraulic system 200 may include multiple hydraulic devices and a relief valve 216 in fluidic communication a fluid reservoir (e.g., a lubricant sump). The hydraulic system 200 may receive fluid (e.g., lubricant such as oil) from the sump. The hydraulic system 200 may act to provide fluid to component(s) 214 (e.g., transmission components) with lubricant demands while the prime mover (e.g., the electric machine 106 of FIG. 1 or an internal combustion engine) is shut down. As described herein, prime mover shut down is an operating condition where the prime mover is not generating and/or transferring mechanical power to downstream components. During prime mover shut down, while a pump 205 (e.g., lubricant pump) is not in operation, and while the transmission output shaft (e.g., output shaft 124) or other suitable shaft to which the PTO assembly, is rotating (during vehicle towing, for instance) the PTO assembly 203 is designed to provide lubricant to the component(s) 214 by way of the hydraulic system 200. In this way, the system (e.g., transmission) is lubricated over a wider range of operating conditions, thereby increasing system longevity when compared to systems which are not designed to lubricate components during towing. The pump 205 may be in fluidic communication with a hydraulic line 256 at a junction 254, the hydraulic line 256 being in fluidic communication with the hydraulic component(s) 214 (e.g., transmission system components).

In some examples, the PTO assembly 203 includes a disconnect clutch 206 (e.g., a passively actuated disconnect clutch) and a bi-directional pump 208. Additionally, the PTO assembly 203 may include a hydraulically actuated valve 202 (e.g., pressure port). The hydraulically actuated valve 202 may allow for use of pressurized lubricant within the hydraulic system 200 to passively actuate the valve, as opposed to manually actuated valves, or actively controlled valves (e.g., solenoid valves) that demand programmatic control logic. For instance, when the pressure of the fluid applied to the valve 202 is greater than a threshold value, the valve transitions into an open position where pressurized fluid can travel from a pump (e.g., a transmission pressure pump) in the transmission or other suitable system, to the valve 202 via an inlet line 207, then through the valve 202, and subsequently to a hydraulic actuator 204 in the disconnect clutch 206. Conversely, when the lubricant pressure applied to the valve drops below the threshold value the valve transitions into a closed position where pressurized fluid flow through the valve is inhibited.

Further, the bi-directional pump 208 allows for lubricant to be pumped from a sump 210 to the hydraulic system (e.g., a transmission lubrication system) via rotation of a pump input shaft 244 in either direction. Thus, the bi-directional pump 208 may provide lubricant to the transmission during operations, such as towing, in which prime mover is shutdown the output shaft is rotating in either a forward or a reverse direction as opposed to a uni-directional pump which may allow for lubricant to be pumped in only one of the two directions. Further, it will be appreciated that the pump input shaft 244 may be rotationally coupled to a transmission shaft such as an output shaft.

The passive hydraulic actuation circuit 201 is designed to initiate engagement/disengagement of the disconnect clutch 206 based on the lubricant pressure within the hydraulic system 200. To expound, shutting down and turning on of the prime mover alters pressure within the circuit to engage and disengage the disconnect clutch 206, respectively. This passive actuation circuit reduces need for other actuators such as solenoids or manual actuators that may increase system complexity and increase time demanded to prepare the vehicle for certain operations, such as towing operation, if desired.

The passive hydraulic actuation circuit 201 routes hydraulic fluid (e.g., e.g., mineral based and/or synthetic oil) to control various hydraulic components. To elaborate the passive hydraulic actuation circuit 201 uses fluid pressure to engage and disengage (or sustain engagement and disengagement of) the disconnect clutch 206. To accomplish this fluid routing, the passive hydraulic actuation circuit 201 may include multiple fluid distribution components, which may include valves, lines, conduits, and the like.

In the example illustrated in FIG. 2, the hydraulic system 200 includes the hydraulically actuated valve 202 in fluidic communication with the hydraulic actuator 204. Pressure within the hydraulic actuator 204 determines actuation of the disconnect clutch 206. The operational state of the bi-directional pump 208 is dependent upon actuation state (engaged vs. disengaged) of the disconnect clutch 206.

The hydraulic system 200 may be configured to hydraulically actuate multiple clutches and/or supply lubricant to multiple hydraulic devices (e.g., hydraulic pumps), each in fluidic communication with a respective hydraulically actuated valve.

The bi-directional pump 208, which in some examples, may be a bi-directional fixed displacement hydraulic lubricant pump. The bi-directional pump 208 may be in fluidic communication with and may receive lubricant from the sump 210 via a pick-up line 248. Further, the bi-directional pump 208 may be a positive displacement hydraulic pump having a housing and a pumping device (e.g., a reciprocating piston (e.g., check-ball piston pump) or rotary device) designed to deliver a pressurized lubricant during each cycle, for instance. Check valves, 228 and 230, in a rectifying setup enable the bi-directional pump 208 to provide lubrication with rotation in either direction, in the illustrated example. However, other pump setups that enable bi-directional functionality may be used in other example.

The hydraulic system 200 may further include a relief valve 216 in fluidic communication with the sump 210, as indicated via fluid return line 250. The relief valve 216, in the illustrated example, is a hydraulically controlled valve designed for selectively discharging lubricant back to the sump 210 when the pressure in the outlet line 256 is above a threshold value. In this way, overpressure conditions, such as during cold starts, in the hydraulic system 200 can be avoided, if desired. The relief valve 216 is shown including a spring 217 that dictates the pressure at which the valve opens. In this way, the relief valve 216 may be passively controlled (e.g., opened and/or closed) to avoid over pressure conditions in passive hydraulic actuation circuit 201. However, relief valves with alternate constructions have been contemplated. The pressure in the hydraulic system 200 may refer to the pressure of the fluid downstream of a junction 254.

The bi-directional pump 208 pressurizes and flows lubricant to the component(s) 214 via the outlet line 256, respectively. Further, the bi-directional pump 208 may be in fluidic communication with the actuation line 246. In this way, the bi-directional pump is able to open the valve 202 and allow fluidic communication between the hydraulic system and the hydraulic actuator.

Further, in one example, lubricant may be returned from the hydraulically actuated valve 202 to the sump 210 via a drain line 258, passing through a check valve 220 and a flow restrictor 242 before returning to the sump 210.

In some examples, the hydraulic actuator 204 may include a hydraulic chamber 270, an actuation piston 272, and a spring 240. The hydraulic actuator 204 may actuate the disconnect clutch 206. Although the disconnect clutch 206 and the hydraulic actuator 204 are separately illustrated in FIG. 2, the clutch actuator may be incorporated in the disconnect clutch, as will be described further below. The actuation piston 272 may be axially slidable in the hydraulic chamber 270. In some examples, the disconnect clutch 206 may include be a hydraulically actuated dog clutch. However, other types of hydraulically operated clutches may be used in other examples.

Pressurized fluid may be supplied to the hydraulic chamber 270 from the hydraulically actuated valve 202 via a hydraulic supply line 280 when the valve 202 is open and permitting fluid flow therethrough. Additionally, the hydraulically actuated valve 202 may be in fluidic communication with the actuation line 246. Further, the outlet line 256 may be in fluidic communication with one or more lubricated components of the transmission via one or more additional lubricant lines.

The disconnect clutch 206 is designed to engage when the lubricant pressure in the hydraulic chamber 270 drops below a threshold value (e.g., a positive non-zero value) to place the actuation piston 272 is in a retracted position. The disconnect clutch 206 may be designed to disengage when the lubricant pressure in the hydraulic chamber 270 is above the threshold value and the actuation piston 272 is in an extended position as a result of hydraulic pressure in the hydraulic chamber 270 causing the actuation piston 272 to move into the extended position and the spring 240 to compress. As will be described in greater detail herein, reduction of pressure in the hydraulic chamber 270 may reduce force on the spring 240, causing the spring 240 to return the actuation piston 272 to the retracted position, thereby engaging the disconnect clutch 206.

As indicated above, the hydraulically actuated valve 202 is designed to passively supply pressurized lubricant to the hydraulic actuator 204 when the fluid pressure applied to the valve rises above a threshold value (e.g., a positive non-zero value), and thus the valve 202 transitions into an open configuration where lubricant flow is permitted between a main circuit in the hydraulic system (which may feed the clutch control system) and the hydraulic actuator 204. The hydraulically actuated valve 202 may include a spring 282 that compresses when the valve 202 is transitioned into the open configuration. When actuated, the hydraulically actuated valve 202 permits pressurized fluid flow from the main circuit (which also feeds the clutch control system) in the hydraulic system through the hydraulically actuated valve 202 and into the hydraulic supply line 280. Lubricant may actively flow through the hydraulically actuated valve 202 while the prime mover is in operation and causes the lubricant pump 205 to generate lubricant flow above a threshold pressure. Thus, the disconnect clutch 206 may be disengaged while the prime mover is in operation and vice versa.

When the prime mover of the vehicle is switched from an operational state to a shutdown state, system pressure from the transmission drops below a threshold and the spring 240 returns the hydraulic actuator 204 to a position that engages the disconnect clutch 206. Subsequently, the bi-directional pump 208 flows pressurized fluid to the component(s) 214 as well as to the valve 202. When the fluid pressure applied to the valve 202 surpasses the threshold value, the valve is closed, thereby inhibiting fluid flow from the main circuit to the hydraulic actuator 204. To elaborate, fluid that remains in the lines is drained to the sump 210 via the flow restrictor 242 (e.g., throttle valve) to enable evacuation of fluid in order to retract the hydraulically actuated valve 202.

Further, engagement of the disconnect clutch 206 actives the bi-directional pump 208 by enabling the transfer of rotational energy from a transmission shaft (e.g., transmission output shaft) to the pump input shaft 244 of the bi-directional pump 208. Rotation of the pump input shaft 244 in turns rotates the bi-directional pump 208, thereby allowing lubricant to be drawn from the sump 210 and delivered to the component(s) 214 for lubrication. A first port 224 (e.g., an inlet) of the bi-directional pump 208 may be in fluidic communication with the first pair of check valves 228 and a second port 226 (e.g., outlet) of the bi-directional pump 208 may be in fluidic communication with the second pair of check valves 230. The first pair of check valves 228 may be configured to allow flow of lubricant from the sump towards the outlet 226. The second pair of check valves 230 may be configured to allow flow of lubricant from the outlet 226 towards outlet line 256. The pairs of check valves allow the pump to receive rotational input in opposing directions and supply lubricant to downstream components. Lubricant may then flow into an oil cooler 212 before passing another check valve 232 and then flowing to component(s) 214 in the system, such as the transmission system. The oil cooler 212 may be configured to control temperature of the lubricant supplied to the component(s) 214 when the prime mover is shut down and the bi-directional pump is providing lubrication to the transmission, for instance. Conversely, when the prime mover is operating, a transmission cooler may be used to control the temperature of the lubricant, in some examples. However, in other examples, the oil cooler may be positioned in a different location or be omitted from the system.

Additionally, when the prime mover is switched from a shutdown state to an operational state, the pressure of the lubricant flow generated by the bi-directional pump 208 increases. As a result, lubricant flows through actuation line 246 to the hydraulically actuated valve 202, passing through a check valve 222. Check valve 222 and other check valves described herein allow one way flow of lubricant when the pressure upstream of the valve exceed a threshold associated with the valve. For example, check valve 232 allows flow of lubricant from the bi-directional pump 208 to a junction 254 but not from the junction 254 towards the bi-directional pump 208. The check valves 228 and 230 may be included in a bi-directional pump assembly 231.

Hydraulic system 200 may further include a pressure sensor 262 (e.g., a pressure switch which may be configured to provide feedback to a controller (e.g., a transmission control unit) which indicates whether the bi-directional pump 208 is disconnected (e.g., generating 0 bar), when the prime mover is in operation.

Now referring to FIGS. 3-5B, an example of a PTO assembly 335 that may be included in a system 300, such as a transmission, is shown. Further, the PTO assembly shown in FIG. 3 may share at least some similarities with the PTO assembly described with regard to FIG. 2. Redundant description of the overlapping features is omitted for brevity.

The multi-speed transmission 300 includes a housing 302 with a prime mover interface shaft with an interface 306 that is profiled to attach a shaft of a prime mover.

In the illustrated example, the housing 302 includes multiple sections: a first section 310 and a second section 308 that are attached to one another via fasteners 312 and/or other suitable attachments. However, other housing contours may be used in other examples.

The system 300 may further include a sump 322 that houses lubricant such as oil for use by other components of the system 300. The lubricant may be used for component lubrication and/or component actuation (e.g., clutch actuation). The housing 302 at least partially encloses an input assembly, a range clutch assembly, and a multi-speed clutch assembly, in some examples.

The PTO assembly 335 include a bi-directional pump 324 that is configured to pump lubricant to a hydraulic system (e.g., the hydraulic system 200, shown in FIG. 2). Pressurized lubricant from the transmission or other suitable system may enter the PTO assembly 335 via a supply line 330. Lubricant may drain from the PTO assembly via a drain line 338. The bi-directional pump 324 may be configured to, when activated, draw lubricant from the sump 322 via a pick-up line 328 and deliver the lubricant to downstream components via an outlet port 332.

A PTO housing 337 may at least partially surround and retain the components in the PTO assembly 335. The PTO housing 337 may efficiently attach to the housing section 308 using fasteners 336 and/or other suitable attachment devices.

A mechanical output interface 314 is further included in the system 300. The output interface 314 may be provided on an end of a transmission output shaft. The mechanical output interface 314 may be positioned below the electric machine interface. In this way, the transmission may achieve a desired amount of drop. However, other transmission input and output interface arrangements have been contemplated.

A pump 316 (e.g., charging pump) may further be included in the system 300. The pump 316 may be driven by a shaft (e.g., an input shaft) in the system 300, in one example. The pump 316 is designed to provide pressurized fluid (e.g., lubricant such as oil) to components of the transmission such as clutches for actuation and/or lubrication, bearings, and the like, in one example. Pressure provided by the pump 316 is also delivered towards the assembly 335 in order to open a disconnect of the PTO assembly 335 (e.g., disconnect clutch 206). The lubricant pump may be a suitable type of pump such as a positive displacement pump. In this way, a space efficient transmission unit with lubricant pump functionality may be achieved, if desired. A-A' denotes the cutting plane for the cross-sectional views depicted in FIGS. 4-5B.

Figure 4:
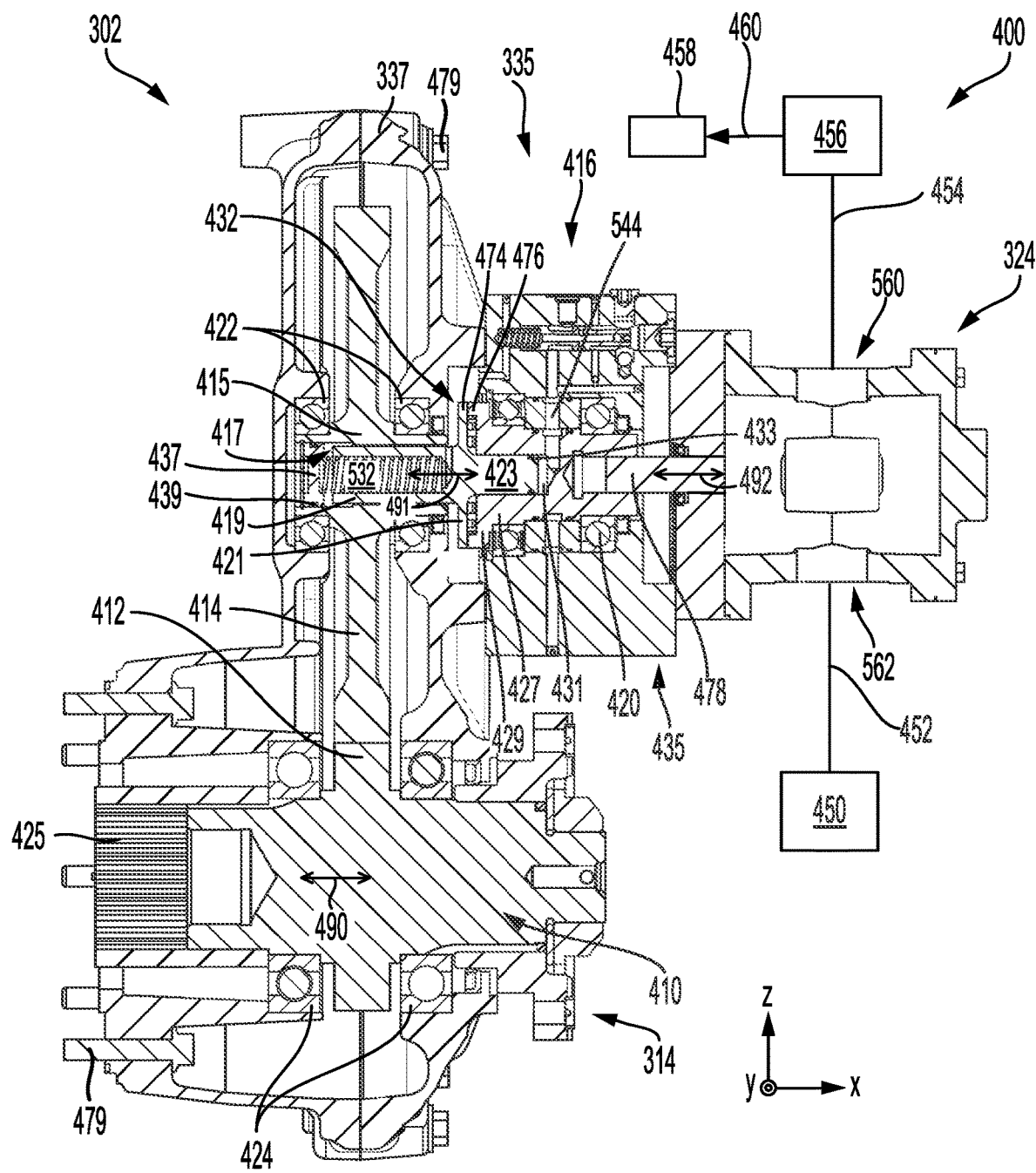
FIG. 4 is a detailed illustration of an exemplary ground driven PTO assembly in the transmission depicted in FIG. 3.

FIG. 4 illustrates a cross-sectional view of the PTO assembly 335 that is coupled to an output shaft 410 of the transmission 300 via a PTO gear set 400. The transmission may include the output shaft 410 that is coupled to other components within the transmission such as gears, shafts, and clutches. However, as previously discussed, the PTO assembly 335 may be coupled to another suitable shaft in the transmission or incorporated into another system.

The output shaft 410 may have the mechanical output interface 314 attached thereto or incorporated therein. The mechanical output interface 314 may be profiled to mechanically attach to downstream driveline components such as shafts, joints, and the like that transfer mechanical power to drive axles. Drive axles may be coupled to wheels of the vehicle such that when the output shaft rotates, the wheels rotate. Consequently, during operations in which a prime mover is not providing power to the transmission 300, such as during a tow operation, the output shaft may rotate as a consequence of the wheels rotating. Such rotation of the output shaft may in turn lead to rotation of other components of the transmission, such as gears within the PTO gear set 400 as well as other shafts and gears of the transmission. Without power from the prime mover, a lubricant pump installed on the transmission may not provide lubrication to the transmission and without lubrication, rotation of components of the transmission may cause frictional wear and degradation. The PTO driven hydraulic pump system utilizes the rotation of the output shaft to provide lubrication to the transmission during such operations.

The PTO gear set 400 may include a second gear 412 that is directly coupled to or formed integrally with the output shaft 410. For instance, the gear 412 and the shaft 410 may be manufactured together via machining, casting, combinations thereof, and the like. However, in other examples, the gear 412 may be splined, attached via fasteners, press-fit, combinations thereof, and the like to the shaft 410. Bearings 424 may support and facilitate rotation of the output shaft 410. Further, the output shaft 410 may include splines 425 which facilitate efficient attachment to another section of the output shaft that extends from the transmission enclosure. The bearings 424 may reside in the PTO housing 337.

The second gear 412 may mesh with a first gear 414. The first gear 414 and other components herein described may be contained within the PTO housing 337. The first gear 414 may be fixedly coupled or incorporated into a shaft 415. Bearings 422, retained in the PTO housing 337, are coupled to the shaft 415 and permit rotation thereof. In the illustrated example, the shaft 415 includes an opening 417 in which an extension 419 of a disconnect clutch 432 is positioned. The extension 419 specifically axially protrudes from a flange 421 which include a first toothed face 474. The extension 419 may axially slidable within the shaft 415. To accomplish this functionality, the shaft 415 and the extension 419 may each include axially extending splines that are mated with one another. As such, the shaft may include interior splines.

A hydraulic actuator in the form of an actuation piston 423 is further included in the disconnect clutch 432 and protrudes from the flange 421 in the opposite axial direction as the extension 419. The actuation piston 423 mates with a recess in a section 427 of the disconnect clutch 432 that includes a flange 429. The flange 429 includes a second toothed face 476 that is designed to engage with the first toothed face 474 and permit torque transfer therethrough when the clutch is engaged.

A hydraulic chamber 431 is formed in the recess of clutch section 427. The hydraulic chamber receives lubricant for clutch actuation, as expanded upon herein with regard to FIGS. 5A and 5B. A seal 433 may be provided around the actuation piston 423 to reduce the chance of oil leakage from the hydraulic chamber 431.

Bearings 420 may be positioned between the clutch section 427 and a section 435 of the PTO housing 337. In this way, the disconnect clutch is able to rotate within the housing. The housing section 435 may be adjacent to (e.g., directly coupled to) the bi-directional pump 324. The bearings 420 may be axially spaced apart to enable a lubricant supply line 544 to extend therebetween and connect with the hydraulic chamber 431.

A stop 437 may be retained within the shaft 415. A spring 532 may be axially delimited via the stop 437. The stop 437 allows the spring 532 to be compressed when the disconnect clutch 432 is disengaged. In the illustrated example, the spring 532 is arranged in a cavity of the extension 419. In this way, the space efficiency of the clutch actuator is increased. However, in other examples, the spring may be positioned external to the extension 419. A seal 439 may circumferentially surround the stop 437 to reduce the chance of oil leakage.

Rotational axes 490, 491, 492 of the output shaft 410, the shaft 415, and the bi-directional pump 324, respectively are provided for reference. It will be understood that the axes 491, 492 are aligned with one another, in the illustrated example, to increase PTO assembly compactness. However, in alternate examples, the axes may not be aligned with one another.

The disconnect clutch 432 may be passively engaged and disengaged, as is further described below. The PTO assembly 335, including the bi-directional pump 324, may be coupled to the transmission, as is further described below. In brief, lubricant (e.g., natural and/or synthetic oil) stored within a sump 450 (e.g., the sump 322 of FIG. 3) may be pumped into a port 562 (e.g., inlet) of the bi-directional pump 324 via a pick-up line 452 (e.g., pick-up line 328 of FIG. 3). Fluid (e.g., lubricant) may then be pumped out of the bi-directional pump 324 (via a port 560) to hydraulic system 456 via fluid line 454. Fluid within the hydraulic system 456 may be directed via one or more fluid lines, conduits, and the like towards components 458 of the hydraulic system, indicated by arrow 460.

In the illustrated example, the disconnect clutch 432 is a dog clutch. To elaborate, the disconnect clutch 432 is a dog clutch with a first toothed face 474 and a second toothed face 476. The first toothed face 474 is rotationally coupled to the first gear 414 and the second toothed face 476 is rotationally coupled to an input shaft 478 of the bi-directional pump 324. As such, mating of the toothed interfaces, during clutch engagement enables rotational energy to be transferred from the PTO gear set 400 to the bi-directional pump 324. Conversely, during clutch disengagement, the toothed interfaces are spaced away from one another, thereby inhibiting rotational energy transfer between the PTO gear set 400 and the bi-directional pump 324. However, in alternate examples the dog clutch may include splined interfaces or another suitable type of clutch may be utilized such as a friction clutch. The dog clutch may exhibit greater space efficiency and reliability when compared to other types of clutches, such as friction clutches.

The PTO assembly 335 may be formed as an interconnected unit that is able to be efficiently moved into positioned and coupled to the transmission housing. To elaborate, the PTO housing 337 may include fasteners 479 that extend therethrough and are profiled to attach to the transmission housing. Consequently, the PTO assembly 335 is capable being efficiency incorporated into the transmission at a later stage in manufacturing, when compared to PTOs that are attached to other transmission shafts such as the input shaft. As a result, the manufacturing process achieves greater adaptability and the PTO assembly may be used in a wider variety of transmissions, thereby increasing customer appeal. However, other PTO assembly constructions have been contemplated.

Figure 5A:
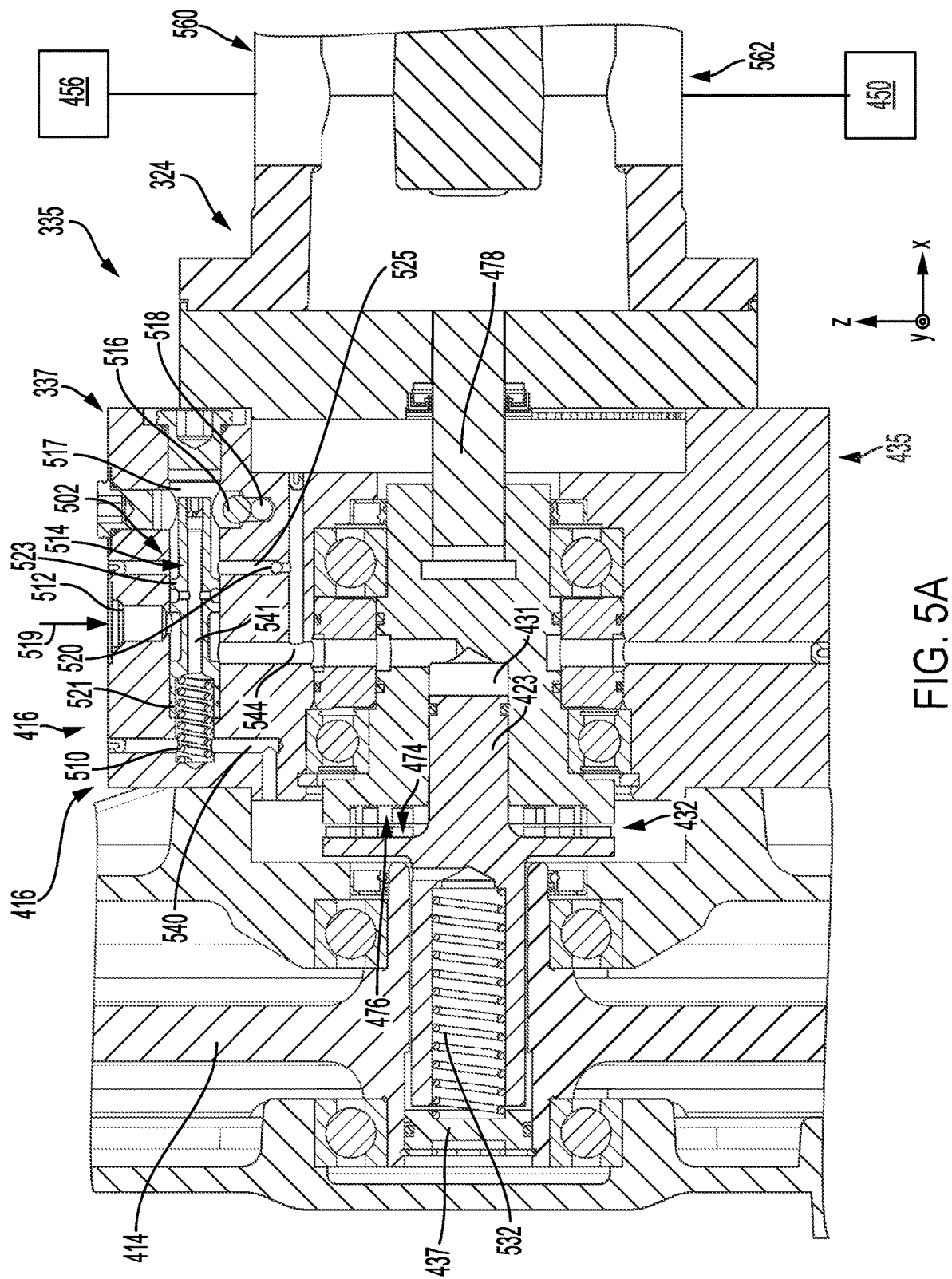
FIG. 5A is a detailed illustration of the PTO assembly, depicted in FIG. 4, with a disconnect clutch in a disengaged state.
Figure 5B:
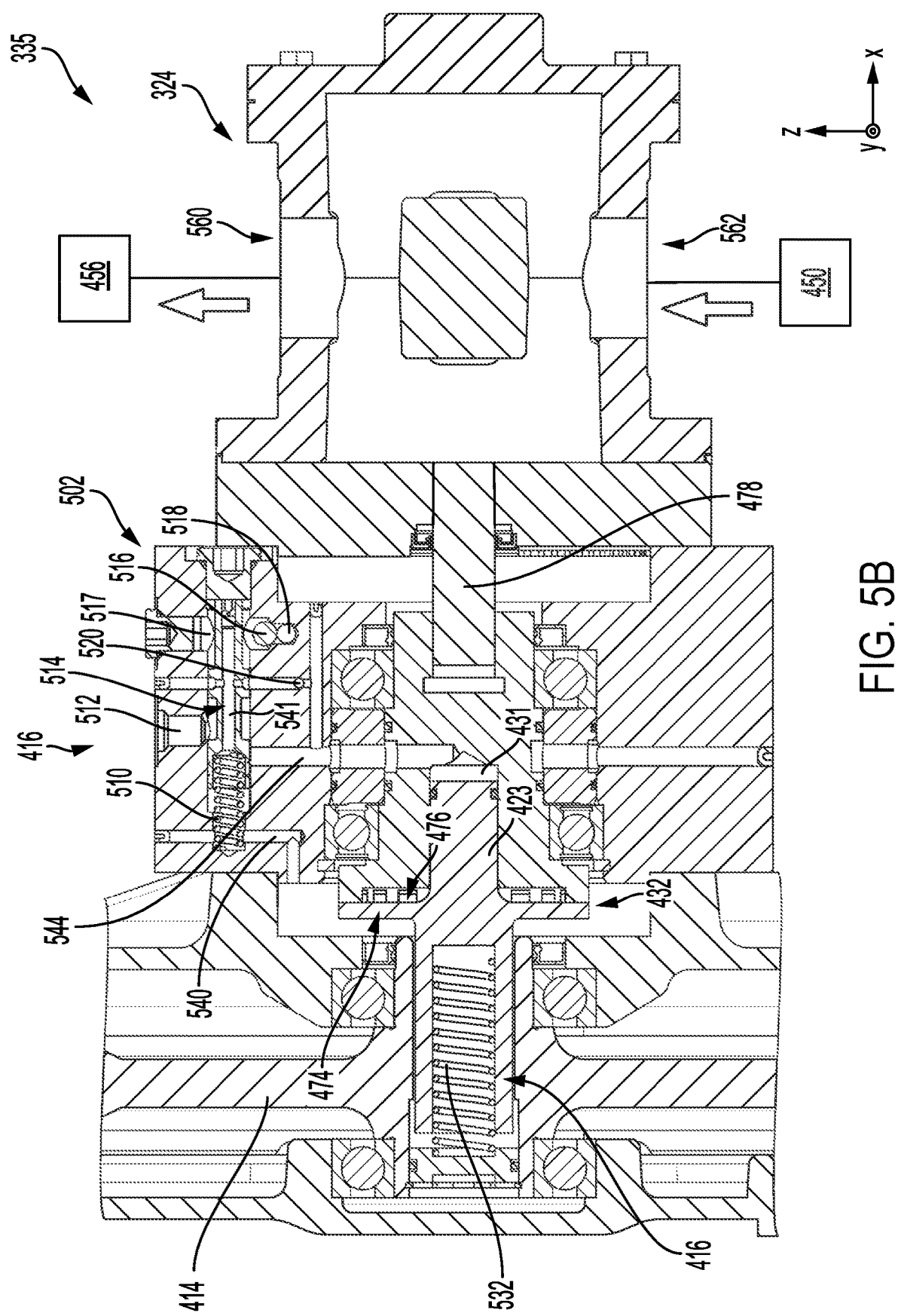
FIG. 5B is a detailed illustration of the PTO assembly, depicted in FIG. 4, with the disconnect clutch in an engaged state.

FIGS. 5A and 5B illustrate the PTO assembly 335 in different configurations. FIG. 5A specifically depicts the PTO assembly 335 with the disconnect clutch 432 disengaged and FIG. 5B conversely depicts the PTO assembly 335 with the disconnect clutch 432 engaged.

As shown in FIG. 5A the disconnect clutch 432 is disengaged. Clutch disengagement occurs when the prime mover, connected to the transmission, is in operation and the transmission pump (which may be driven by the prime mover) is supplying pressurized fluid to the transmission. The disconnect clutch hydraulic actuator 416 includes a hydraulically actuated valve 502 in the depicted embodiment. However, other actuator configurations may be used in other embodiments. Further, the valve 502 includes a sleeve 514 (e.g., spool) in the illustrated example. The sleeve 514 is positioned in a cavity of the PTO housing 337 and axially translates therein during valve actuation. Various hydraulic passages, lines, and the like are fluidly coupled to the cavity in which the sleeve 514 resides to enable lubricant routing to be altered based on the sleeve's position. To expound, a first inlet port 518 (in fluidic communication with the hydraulic system) is fluidly coupled to a sleeve actuation chamber 517 (e.g., a hydraulic chamber) via a check valve 516. It will be specifically understood, that an actuation line may be in fluidic communication with the inlet port 518 and a lubricant conduit in the hydraulic system. As such, when the lubricant pressure in the hydraulic system surpasses the check valve threshold, lubricant travels into the sleeve actuation chamber 517. A second inlet port 512 is additionally fluidly coupled to the sleeve cavity. In the illustrated example, the second inlet port 512 is in fluidic communication with the hydraulic system and receives lubricant therefrom as denoted via arrow 519. To expound, the arrow 519 may represent a transmission lubricant supply line for the valve 502.

FIG. 5A shows the valve 502 in an open position. The valve 502 transitions into the open position when pressure in the sleeve actuation chamber 517 exerts a force on the sleeve 514 that is greater than a constant of a spring 510, coupled to the sleeve, and therefore urges the sleeve in an axial direction (leftward in the frame of reference of FIG. 5A). When the sleeve is in a position which compresses the spring 510, lubricant is allowed to flow from the second inlet port 512 to the hydraulic chamber 431 by way of the lubricant supply line 544.

A portion of the spring 510 (including a first end) may be positioned in a recess in the sleeve 514 to increase assembly compactness. Further, the spring 510 is delimited at a second end via a detent in the PTO housing section 435. A first land 521 in the sleeve 514 allows the second portion to be selectively blocked. Further, a second land 523 in the sleeve 514 allows the sleeve actuation chamber 517 to be fluidly separated from the path of lubricant which travels between the second inlet portion 512 and the lubricant supply line 544. The disconnect clutch hydraulic actuator 416 may further include a return line 525 with a check valve 520 positioned therein. The check valve 520 opens when the pressure in the lubricant supply line 544 exceeds a threshold pressure (e.g., 20 bar, in one use-case example). In this way, overpressure conditions in the hydraulic chamber may be avoided, if desired.

In turn, pressurized lubricant will flow from the lubricant supply line 544 into the hydraulic chamber 431 with the actuation piston 423 positioned therein. As previously indicated, when the chamber pressure exceeds a threshold, the actuation piston 423 moves the disconnect clutch 432 into a disengaged position where the toothed faces 474 and 476 are decoupled and spaced apart from one another. In this way, the disconnect clutch 432 is passively disengaged when the pressure of the lubricant in the hydraulic system surpasses a threshold pressure. Torque transfer from the gear 414 to the bi-directional pump 324 is inhibited when the disconnect clutch 432 is disengaged. A drain 540 may allow drainage of lubricant from the PTO assembly 335 into the sump. Specifically, in the illustrated example, the drain 540 is in fluidic communication with a passage 541 within the sleeve 514 that is aligned with the return line 525, when the valve 502 is closed (as shown in FIG. 5B). However, alternate drain passage arrangements may be used in alternate examples.

Conversely, FIG. 5B shows the disconnect clutch 432 in an engaged configuration, during prime mover shutdown. During these conditions, the hydraulically actuated valve 502 is closed and inhibiting lubricant flow from the second inlet port 512 to the lubricant supply line 544. Therefore, lubricant flow into the hydraulic chamber 431 of the disconnect clutch hydraulic actuator 416 is inhibited when the hydraulically actuated valve 502 is closed and therefore the forces acting upon the actuation piston 423 drops and consequently, with the actuation piston 423 axially moves into a neutral position in which the toothed faces 474, 476 are mated and the disconnect clutch 432 is consequently engaged.

With the disconnect clutch 432 engaged, rotational torque is able to be transferred from the gear 414 to the bi-directional pump 324 via the input shaft 478, as described above. Lubricant is consequently pumped from the sump 450 to the hydraulic system 456 via the bi-directional pump 324. The lubricant enters the pump via the port 562 and exits the pump via port 560.

It will be appreciated that due to the configuration of the disconnect clutch hydraulic actuator, the bi-directional pump 324 will continue to provide lubricant to the transmission until the lubricant pump drives by the prime mover generate a lubricant pressure greater than a threshold value. As such, both the bi-directional pump and the lubrication pump may be concurrently operated for a brief duration after prime mover start up. However, once the lubricant pressure surpasses the threshold, the bi-directional pump is passively disconnected. In this way, the chance of the transmission not receiving a target amount of lubricant during prime mover start up is decreased, thereby increasing transmission longevity.

Figure 6:
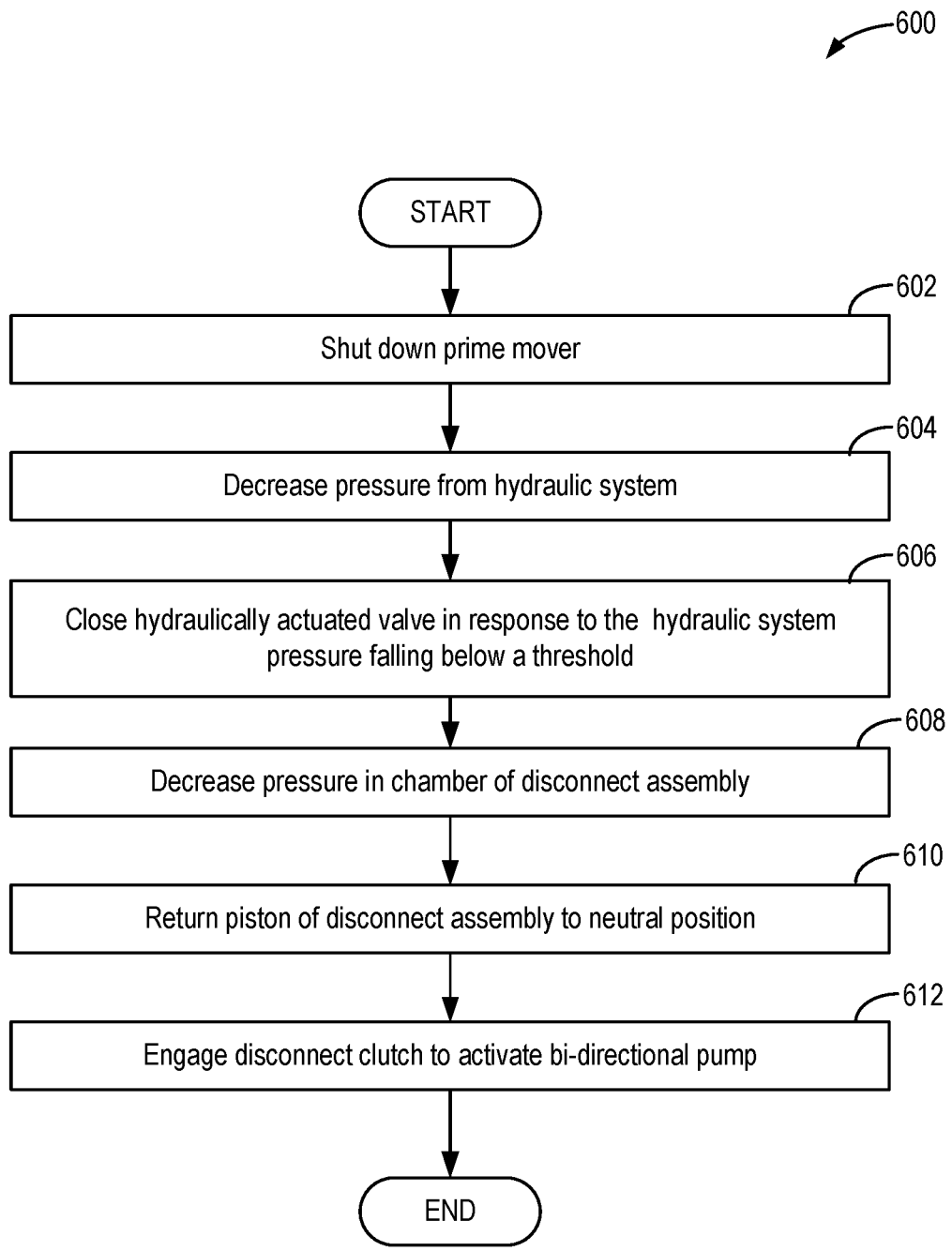
FIG. 6 is a method for operation of the disconnect clutch upon prime mover shut down.

FIG. 6 depicts a method 600 for a PTO assembly and hydraulic system. The method 600 occurs when the prime mover transitions from an operation state to a shut down state. The method 600 may be carried out by a PTO assembly and/or hydraulic system such as any of the previously described PTO assemblies and hydraulic systems or combinations thereof. However, in other examples, the method 600 may be implemented in other suitable PTO assemblies and/or hydraulic systems. At least a portion of the steps in the method are passively implemented based on lubricant pressure within the hydraulic system. To elaborate, step 602 is an active step that is carried out in response to operator interaction with the vehicle and steps 604-612 are passive actions that occur as a consequence of the active step 602.

Prior to the start of method 600, the prime mover is in operation and driving the transmission lubrication pump. As such, during prime mover operation, pressurized lubricant is directed from the hydraulic system to a disconnect clutch in the PTO assembly. Further, while the prime mover is operating, pressurized lubricant from the system flows through a hydraulically actuated valve (e.g., hydraulically actuated valve 502 of FIGS. 5A and 5B) and into a chamber (e.g., chamber 431 of FIGS. 5A and 5B) of a disconnect clutch hydraulic actuator (e.g., disconnect clutch hydraulic actuator 416), sustaining the disconnect clutch (e.g., disconnect clutch 432) in a disengaged position by moving a piston (e.g., actuation piston 423 of FIGS. 5A and 5B). Disengagement of the disconnect clutch inhibits mechanical power transfer from the transmission to a bi-directional pump.

At 602, the method 600 includes shutting down the prime mover (e.g., electric machine 106 of FIG. 1). Instructions for carrying out prime mover shut down may be executed by a controller and may be stored on a memory of the controller. Method 600 then proceeds to 604.

At 604, the method 600 includes decreasing the pressure in the hydraulic system as a result of the prime mover shutting down. Method 600 then proceeds to 606.

At 606, the method 600 includes closing the hydraulically actuated valve in response to the hydraulic system pressure falling below a threshold pressure. To elaborate, the hydraulically actuated valve closes due to a return spring (e.g., return spring 510) urging a sleeve (e.g., sleeve 514) of the hydraulically actuated valve to a neutral position, the neutral position being a closed position which inhibits lubricant delivery to the disconnect clutch actuator. Method 600 then proceeds to 608.

At 608, the method 600 includes decreasing the pressure in the chamber of the disconnect clutch actuator. Without system pressure entering the hydraulic system, the pressure within the chamber drops below a threshold. Method 600 then proceeds to 610.

At 610, the method 600 includes returning the piston to a neutral position. Method 600 then proceeds to 612. At 612, the method 600 includes engaging the disconnect clutch, as a result of the piston returning to the neutral position, to activate the bi-directional pump. Engagement of the disconnect clutch rotationally couples a bi-directional PTO pump (e.g., bi-directional pump 324) to an output shaft of a transmission via a PTO gear set. The bi-directional PTO pump therefore pumps lubricant from a sump to the transmission of the vehicle when the output shaft rotates, such as during a tow operation on which one or more wheels are in contact with a ground surface (e.g., a road). The PTO gear set may be part of a PTO that derives rotation from rotation of the output shaft, thereby allowing rotation of components of the hydraulic system (e.g., the bi-directional pump) when the disconnect clutch is engaged and the output shaft is rotating. The method 600 ends after 612.

Figure 7:
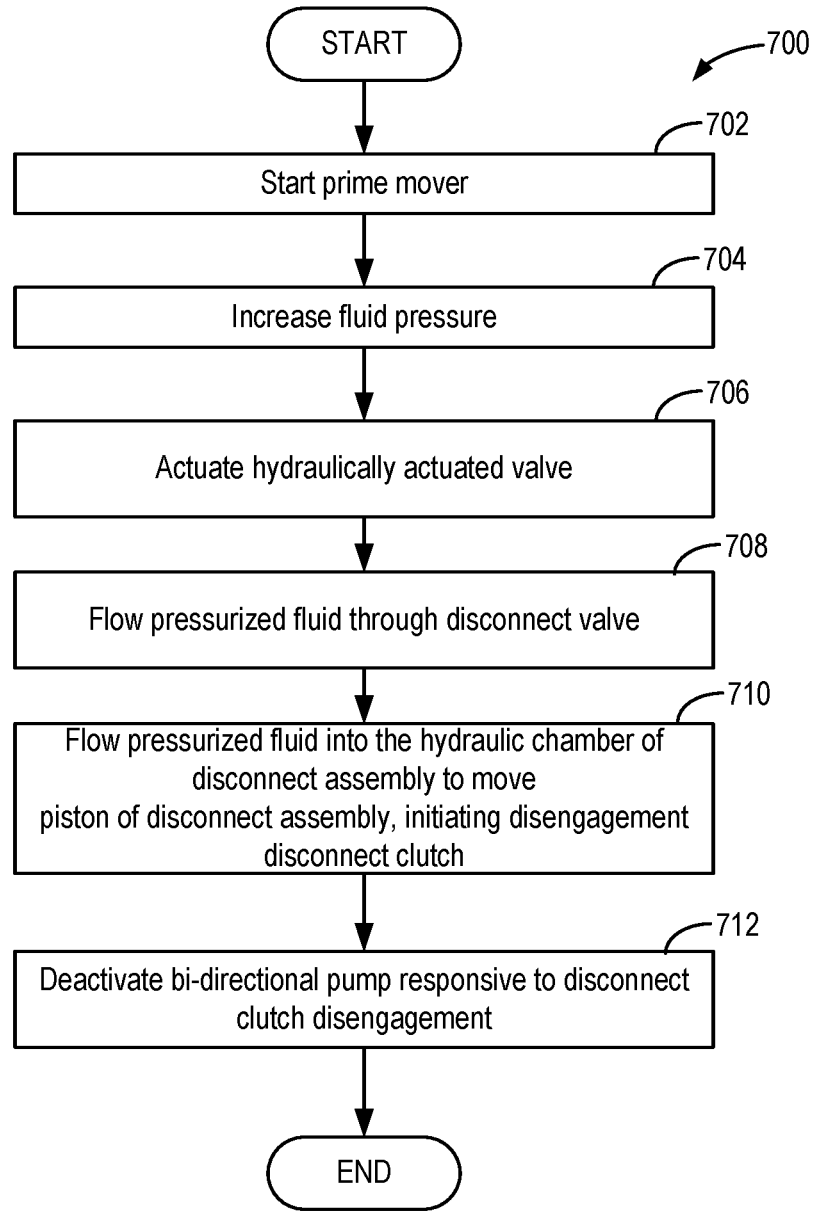
FIG. 7 is a method for operation of the disconnect clutch upon prime mover start up.

FIG. 7 depicts another method 700 for the PTO assembly and lubrication system. The method 700 occurs when the prime mover transitions from a shut down state to an operation state. The method 700 is carried by the assembly and system used to implement the method 600. Further, at least a portion of the steps in the method 700 are passively implemented based on lubricant pressure within the hydraulic system. To elaborate, step 702 is an active step that is carried out in response to operator interaction with the vehicle and steps 704-712 are passive actions that occur as a consequence of the active step 702.

Prior to the start of method 700, the prime mover is shut down and the bi-directional pump in the PTO assembly therefore delivers lubricant to the transmission when the output shaft is rotating (e.g., during towing or when the prime mover in non-operational and the vehicle is coasting). The hydraulically actuated valve is therefore in a closed position prior to the start of method 700. During prime mover shutdown, the hydraulic system pressure is below the threshold for actuation of the hydraulically actuated valve.

At 702, the method 700 includes starting the prime mover. Instructions for starting the prime mover may be executed by a controller and stored on a memory of the controller. Once the prime mover is in operation, the lubricant pressure in the hydraulic system rises but the hydraulically actuated valve remains closed thereby inhibiting oil flow to the disconnect clutch actuator. Method 700 then proceeds to 704.

At 704, the method 700 includes increasing lubricant pressure within the actuation line above a threshold pressure. Method 700 then proceeds to 706. At 706, the method 700 includes passively actuating the hydraulically actuated valve due to a sleeve within the hydraulically actuated valve transitioning from a closed position into an open position. Method 700 then proceeds to 708.

At 708, the method 700 includes flowing pressurized fluid through the valve in the disconnect clutch actuator. The system pressure may maintain the actuated position of the hydraulically actuated valve even when fluid pressure decreases. Method 700 then proceeds to 710.

At 710, the method 700 includes the flowing pressurized fluid into the hydraulic chamber to move the piston of the disconnect clutch actuator, initiating disengagement of the disconnect clutch. To elaborate, the fluid exerts a force on the piston, the force being above the threshold for the piston to compress the spring of the disconnect clutch actuator. The piston moving and the spring compression initiates disengagement of the disconnect clutch. The method 700 then proceeds to 712.

At 712, the method 700 includes the deactivating the bi-directional pump in response to disconnect clutch disengagement. Therefore, with the disconnect clutch disengaged, power transfer from a PTO input shaft to the bi-directional pump is inhibited. As such, the bi-directional pump does not pump lubricant. After 712, the method ends.

Figure 8:
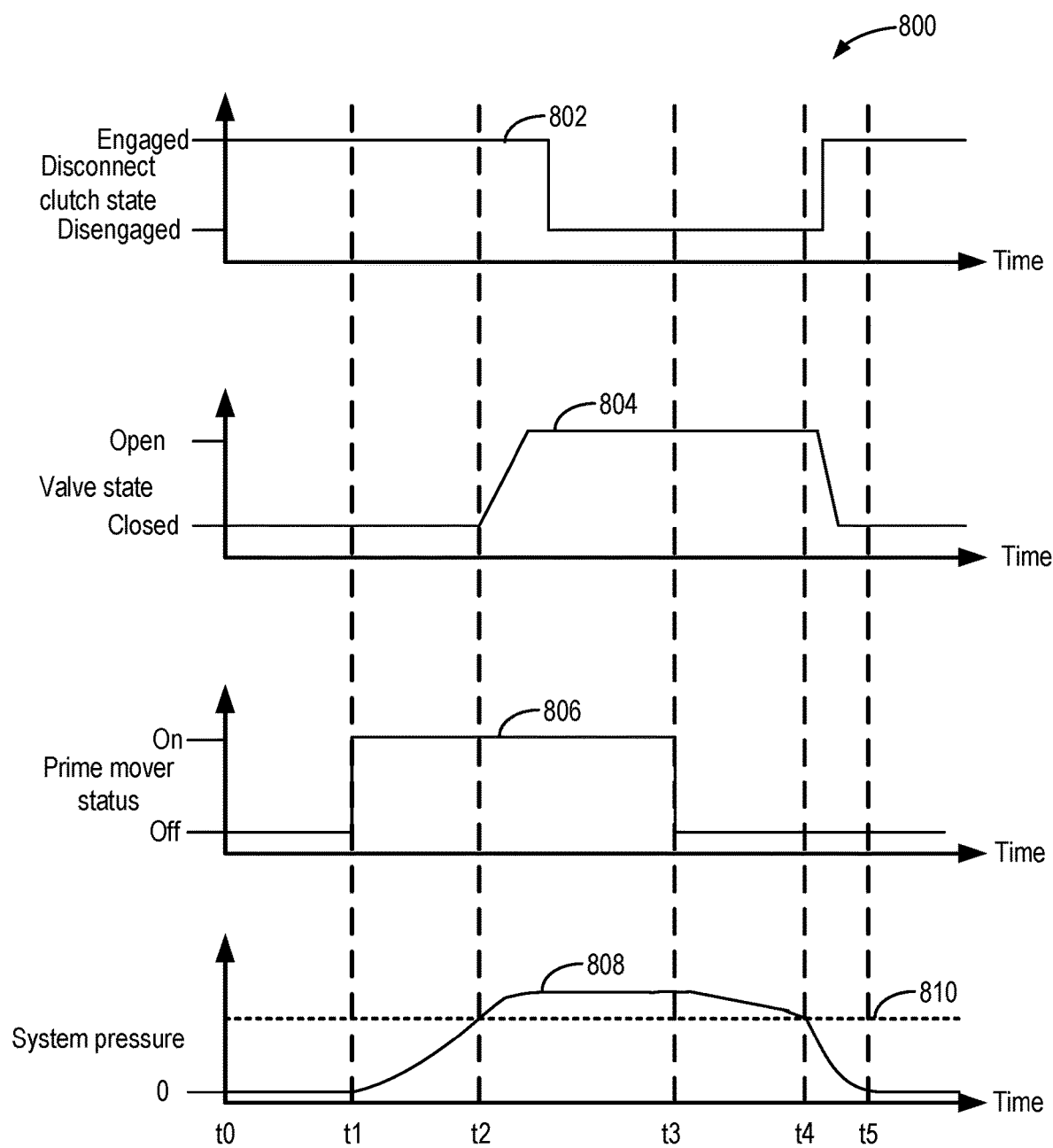
FIG. 8 is a timing diagram for a use-case scenario for a PTO assembly with a disconnect clutch.

FIG. 8 illustrates a timing diagram 800 of a use-case scenario for a PTO assembly and hydraulic system, such as any of the previously described PTO assemblies and hydraulic systems or combinations thereof. In each graph, time is indicated on the abscissa and increases from left to right. The ordinate for plot 802 indicates an operational state of a disconnect clutch ("Engaged" and "Disengaged"). Engaged indicates that the clutch permits rotational energy transfer therethrough and disengaged denotes that rotational energy transfer through the clutch is inhibited. While the clutch is engaged, the bi-directional pump is driven by rotation of transmission output shaft that may be brought about via towing operation or when the prime mover is non-operational but coasting. The ordinate for plot 804 indicates an operational state of the hydraulically actuated valve ("Open" and "Closed"). The ordinate for plot 806 indicates an operation state of the prime mover ("On" and "Off"). The ordinate for plot 808 indicates hydraulic system pressure, where the pressure increases along the ordinate from zero towards the arrow.

At t0, the prime mover is off, the disconnect clutch is engaged, the hydraulically actuated valve is in a closed position, and system pressure is zero. At t1, the prime mover is transitions from off to on. Between t1 and t2, system pressure increases. At t2, lubricant pressure passes the threshold 810. Between t2 and t3, the hydraulically actuated valve state switches from closed to open, then the disconnect clutch switches from engaged to disengaged. At t3, the prime mover transitions from on to off, causing the system pressure to then drop below the threshold 810 at t4. When the system pressure drops below the threshold, the valve switches back to a closed position and the clutch again engages. From t4 to t5, system pressure decreases to zero.

The technical effect of the operating methods of the passive hydraulically actuated PTO assembly herein described is to efficiently provide lubricant to a transmission with a prime mover either powered on or powered off. A lubricant pump coupled to the transmission may lubricate the transmission when the prime mover is in operation and a PTO assembly may lubricate the transmission when the prime mover is shut down and wheels are rotating, such as during a tow operation or during conditions where the prime mover is not operational. Lubricating the transmission during such tow operation and other modes where the prime mover is shut down or non-operational but the transmissions is receiving rotational input may reduce degradation of the transmission. The passive nature of the hydraulic circuit allows for transmission lubrication without operator input or need for separate components such as a lube pump, if desired.

FIGS. 3, 4, 5A, and 5B are drawn approximately to scale, aside from the schematically depicted components, though other relative component dimensions may be used in other embodiments.

FIGS. 1-5B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a power take-off (PTO) assembly is provided that comprises a bi-directional pump in fluidic communication with a fluid reservoir and a hydraulic system; and a passively actuated disconnect clutch configured to mechanically disconnect the bi-directional pump from a transmission when a prime mover is in operation and mechanically connect the bi-directional pump to the transmission when the prime mover is shut down.

In another aspect, a method is provided that comprises during prime mover operation, directing fluid from a hydraulic system to a disconnect clutch to sustain disengagement or initiate disengagement of the disconnect clutch and inhibit mechanical power transfer between a transmission and a bi-directional pump that is in fluidic communication with the hydraulic system; and during prime mover shutdown, inhibiting fluid delivery to the disconnect clutch to transition the disconnect clutch into an engaged position that permits mechanical power transfer between the transmission and the bi-directional pump. The method may further comprise, in one example, during a transition from the engaged position to a disengaged position of the disconnect clutch, sustaining engagement of the disconnect clutch until a pump causes a fluid pressure in an actuation line to rise above a threshold value and a hydraulically actuated valve permits fluid flow to the disconnect clutch.

In yet another example, a power take-off (PTO) assembly is provided that comprises a bi-directional pump in fluidic communication with a sump and a hydraulic system for a multi-speed transmission; a hydraulically actuated dog clutch that mechanically connects and disconnects the multi-speed transmission from the PTO pump; and a hydraulically actuated valve that permits and inhibits oil flow to an actuation piston in the hydraulically actuated dog clutch; wherein when the hydraulically actuated valve is open and permitting oil flow that is above a threshold pressure to the actuation piston, the actuation piston disengages the hydraulically actuated dog clutch; and wherein when the hydraulically actuated valve is closed and inhibiting oil flow to the actuation piston, the actuation piston engages the hydraulically actuated dog clutch.

In any of the aspects or combinations of the aspects, the passively actuated disconnect clutch may include a first toothed face that is coupled to a first gear that meshes with a second gear that is coupled to an output shaft that includes an output interface.

In any of the aspects or combinations of the aspects, the passively actuated disconnect clutch may include a second toothed face that is coupled to a shaft in the bi-directional pump.

In any of the aspects or combinations of the aspects, the PTO assembly may further comprise a hydraulically actuated valve that is in fluidic communication with a hydraulic actuator of the passively actuated disconnect clutch.

In any of the aspects or combinations of the aspects, the hydraulically actuated valve may include an actuation line that is hydraulically coupled to an outlet line of the bi-directional pump.

In any of the aspects or combinations of the aspects, the outlet line may be in fluidic communication with one or more lubricated components.

In any of the aspects or combinations of the aspects, when a pressure of a fluid in the actuation line is above a threshold pressure, the hydraulically actuated valve may permit pressurized fluid flow to the passively actuated disconnect clutch and disengage the passively actuated disconnect clutch; and when the pressure of the fluid in the actuation line is below a threshold pressure, the hydraulically actuated valve may inhibit pressurized fluid flow to the passively actuated disconnect clutch and engage the passively actuated disconnect clutch.

In any of the aspects or combinations of the aspects, the PTO assembly may further comprise a first pair of check valves in fluidic communication with a first port of the bi-directional pump.

In any of the aspects or combinations of the aspects, the PTO assembly may further comprise a second pair of check valves in fluidic communication with a second port of the bi-directional pump.

In any of the aspects or combinations of the aspects, the prime mover may be an internal combustion engine.

In any of the aspects or combinations of the aspects, the prime mover may be an electric motor.

In any of the aspects or combinations of the aspects, the transmission may be a multi-speed transmission that includes two or more clutches.

In any of the aspects or combinations of the aspects, a fluid in the fluid reservoir may be oil.

In any of the aspects or combinations of the aspects, mechanical power may be transferred from an output shaft of the transmission to the bi-directional pump.

In any of the aspects or combinations of the aspects, the hydraulically actuated valve may be actuated via an actuation line that may be in fluidic communication with the hydraulic system.

In any of the aspects or combinations of the aspects, the hydraulic system may include a pump that is driven by a prime mover.

In any of the aspects or combinations of the aspects, the prime mover may be a traction motor.

In another representation, a ground driven power take-off box is provided that includes a passive hydraulically actuated disconnect clutch that is configured to rotationally disconnect a lubricant pump from a mechanical input when a prime mover is in operation and configured to rotationally connect the lubricant pump and the mechanical input when the prime mover is shutdown.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of electric machines and/or internal combustion engines. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range, unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A power take-off (PTO) assembly, comprising:
  a bi-directional pump in fluidic communication with a fluid reservoir and a hydraulic system;
  a passively actuated disconnect clutch configured to mechanically disconnect the bi-directional pump from a transmission when a prime mover is in operation and mechanically connect the bi-directional pump to the transmission when the prime mover is shut down; and
  a hydraulically actuated valve that is in fluidic communication with a hydraulic actuator of the passively actuated disconnect clutch.

2. The PTO assembly of claim 1, wherein the passively actuated disconnect clutch includes a first toothed face that is coupled to a first gear that meshes with a second gear that is coupled to an output shaft that includes an output interface.

3. The PTO assembly of claim 2, wherein the passively actuated disconnect clutch includes a second toothed face that is coupled to a shaft in the bi-directional pump.

4. The PTO assembly of claim 1, wherein the hydraulically actuated valve includes an actuation line that is hydraulically coupled to an outlet line of the bi-directional pump.

5. The PTO assembly of claim 4, wherein the outlet line is in fluidic communication with one or more lubricated components.

6. The PTO assembly of claim 4, wherein:
  when a pressure of a fluid in the actuation line is above a threshold pressure, the hydraulically actuated valve permits pressurized fluid flow to the passively actuated disconnect clutch and disengage the passively actuated disconnect clutch; and
  when the pressure of the fluid in the actuation line is below a threshold pressure, the hydraulically actuated valve inhibits pressurized fluid flow to the passively actuated disconnect clutch and engage the passively actuated disconnect clutch.

7. The PTO assembly of claim 1, further comprising a first pair of check valves in fluidic communication with a first port of the bi-directional pump.

8. The PTO assembly of claim 7, further comprising a second pair of check valves in fluidic communication with a second port of the bi-directional pump.

9. The PTO assembly of claim 1, wherein the prime mover is an internal combustion engine.

10. The PTO assembly of claim 1, wherein the prime mover is an electric motor.

11. The PTO assembly of claim 1, wherein the transmission is a multi-speed transmission that includes two or more clutches.

12. The PTO assembly of claim 1, wherein a fluid in the fluid reservoir is oil.

13. A method, comprising:
   during prime mover operation, directing fluid from a hydraulic system to a disconnect clutch to sustain disengagement or initiate disengagement of the disconnect clutch and inhibit mechanical power transfer between a transmission and a bi-directional pump that is in fluidic communication with the hydraulic system; and
   during prime mover shutdown, inhibiting fluid delivery to the disconnect clutch to transition the disconnect clutch into an engaged position that permits mechanical power transfer between the transmission and the bi-directional pump.

14. The method of claim 13, wherein mechanical power is transferred from an output shaft of the transmission to the bi-directional pump.

15. The method of claim 13, further comprising, during a transition from the engaged position to a disengaged position of the disconnect clutch, sustaining engagement of the disconnect clutch until a pump causes a fluid pressure in an actuation line to rise above a threshold value and a hydraulically actuated valve permits fluid flow to the disconnect clutch.

16. A power take-off (PTO) assembly, comprising:
   a bi-directional pump in fluidic communication with a sump and a hydraulic system for a multi-speed transmission;
   a hydraulically actuated dog clutch that mechanically connects and disconnects the multi-speed transmission from the bi-directional pump; and
   a hydraulically actuated valve that permits and inhibits oil flow to an actuation piston in the hydraulically actuated dog clutch;
   wherein, when the hydraulically actuated valve is open and permitting oil flow that is above a threshold pressure to the actuation piston, the actuation piston disengages the hydraulically actuated dog clutch; and
   wherein, when the hydraulically actuated valve is closed and inhibiting oil flow to the actuation piston, the actuation piston engages the hydraulically actuated dog clutch.

17. The PTO assembly of claim 16, wherein the hydraulically actuated valve is actuated via an actuation line that is in fluidic communication with the hydraulic system.

18. The PTO assembly of claim 17, wherein the hydraulic system includes a pump that is driven by a prime mover.

19. The PTO assembly of claim 18, wherein the prime mover is a traction motor.

\* \* \* \* \*